United States Patent
Chiang (10) Patent No.: US 11,630,769 B2
(45) Date of Patent: Apr. 18, 2023

(54) DATA PROCESSING METHOD FOR CONTROLLING WRITE SPEED OF MEMORY DEVICE TO AVOID SIGNIFICANT WRITE DELAY AND DATA STORAGE DEVICE UTILIZING THE SAME

(71) Applicant: Silicon Motion, Inc., Hsinchu County (TW)

(72) Inventor: Tsung-Yao Chiang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/341,410

(22) Filed: Jun. 8, 2021

(65) Prior Publication Data
US 2022/0035736 A1 Feb. 3, 2022

(30) Foreign Application Priority Data
Jul. 29, 2020 (TW) .................................. 109125595

(51) Int. Cl.
*G06F 12/02* (2006.01)
*G06F 3/06* (2006.01)

(52) U.S. Cl.
CPC ........ *G06F 12/0253* (2013.01); *G06F 3/0613* (2013.01); *G06F 3/0656* (2013.01); *G06F 3/0679* (2013.01); *G06F 12/0246* (2013.01)

(58) Field of Classification Search
CPC ............. G06F 12/0253; G06F 12/0246; G06F 3/0613; G06F 3/0656; G06F 3/0679
See application file for complete search history.

(56) References Cited

U.S. PATENT DOCUMENTS

| | | | |
|---|---|---|---|
| 8,700,949 B2 | 4/2014 | Eleftheriou | |
| 8,990,458 B2 | 3/2015 | Yano | |
| 2008/0307164 A1* | 12/2008 | Sinclair | G06F 12/0246 711/135 |
| 2014/0181455 A1 | 6/2014 | Wang | |
| 2016/0210060 A1* | 7/2016 | Dreyer | G06F 3/0659 |
| 2018/0210531 A1* | 7/2018 | Shahneous Bari | G06F 3/0679 |

(Continued)

FOREIGN PATENT DOCUMENTS

| | | |
|---|---|---|
| TW | 200926183 | 6/2009 |
| TW | 201814528 A | 4/2018 |

*Primary Examiner* — Nanci N Wong
(74) *Attorney, Agent, or Firm* — Winston Hsu (57) ABSTRACT

A memory controller includes a buffer memory and a microprocessor. The buffer memory includes at least a first cache memory and a second cache memory. The microprocessor is configured to control access of a flash memory device. The microprocessor is configured to obtain a number of spare blocks of the flash memory device corresponding to a first operation period, determine a write speed compensation value, determine a target write speed according to the write speed compensation value and a balance speed, and determine a target garbage collection speed according to the target write speed. The microprocessor is further configured to perform one or more write operations in response to one or more write commands received from a host device in the first operation period according to the target write speed and perform at least one garbage collection operation according to the target garbage collection speed.

15 Claims, 6 Drawing Sheets

(56) References Cited

U.S. PATENT DOCUMENTS

2019/0227927 A1\* 7/2019 Miao ................... G06F 3/0608
2019/0303024 A1\* 10/2019 Iwai .................... G06F 3/0679
2020/0073795 A1\* 3/2020 Asano .................. G06F 3/0656

\* cited by examiner

DATA PROCESSING METHOD FOR CONTROLLING WRITE SPEED OF MEMORY DEVICE TO AVOID SIGNIFICANT WRITE DELAY AND DATA STORAGE DEVICE UTILIZING THE SAME

BACKGROUND OF THE INVENTION

1. Field of the Invention

The invention relates to a data processing method, more particularly, to a data processing method for effectively controlling write speed of a memory device to avoid significant write delay and the associated data storage device.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve access performance of the data storage devices and to avoid the generation of significant write delay to lead to poor user experience, a novel data processing method for effectively controlling write speed of a memory device and the associated data storage device are proposed. By applying the proposed data processing method, the write speed is kept stable and will not drop greatly due to the execution of Garbage Collection (GC) operations, thereby avoiding a significant write delay.

SUMMARY OF THE INVENTION

It is an objective of the invention to provide a novel data processing method for effectively controlling write speed of a memory device. The number of spare blocks can be well controlled by controlling a ratio of the write speed and a garbage collection speed, thereby stabilizing the number of spare blocks. When the number of spare blocks is stabilized, the write speed is stabilized as well, and will not drop greatly due to the execution of Garbage Collection (GC) operations, thereby avoiding a significant write delay.

According to an embodiment of the present invention, a memory controller coupled to a host device and a flash memory device and configured to access the flash memory device comprises a buffer memory and a microprocessor. The buffer memory comprises at least a first cache memory and a second cache memory. The microprocessor is configured to control access of the flash memory device. The microprocessor is configured to obtain a number of spare blocks of the flash memory device corresponding to a first operation period, determine a write speed compensation value according to the number of spare blocks, determine a target write speed according to the write speed compensation value and a balance speed, and determine a target garbage collection speed according to the target write speed. The microprocessor is further configured to process one or more write commands received from the host device in the first operation period according to the target write speed and perform at least one garbage collection operation in the first operation period according to the target garbage collection speed.

According to another embodiment of the invention, a data processing method for a data storage device comprising a memory device and a memory controller is proposed. The memory device comprises a plurality of memory blocks and the memory blocks comprising a plurality of spare blocks. The data processing method comprises: obtaining a number of spare blocks corresponding to a first operation period; determining a write speed compensation value according to the number of spare blocks; determining a target write speed according to the write speed compensation value and a balance speed; determining a target garbage collection speed according to the target write speed; processing one or more write commands received from a host device in the first operation period according to the target write speed; and performing at least one garbage collection operation in the first operation period according to the target garbage collection speed.

According to yet another embodiment of the invention, a data storage device, coupled to a host device, comprises a flash memory device and a memory controller. The flash memory device comprises a plurality memory blocks, and the memory blocks comprises a plurality of spare blocks. The memory controller is coupled to the flash memory device and configured to access the flash memory device. The memory controller is configured to obtain a number of spare blocks corresponding to an operation period, determine a write speed compensation value according to the number of spare blocks, determine a target write speed according to the write speed compensation value and a balance speed, and determine a target garbage collection speed according to the target write speed. The memory controller is further configured to process one or more write commands received from the host device in the operation period according to the target write speed and perform at least one garbage collection operation in the operation period according to the target garbage collection speed.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
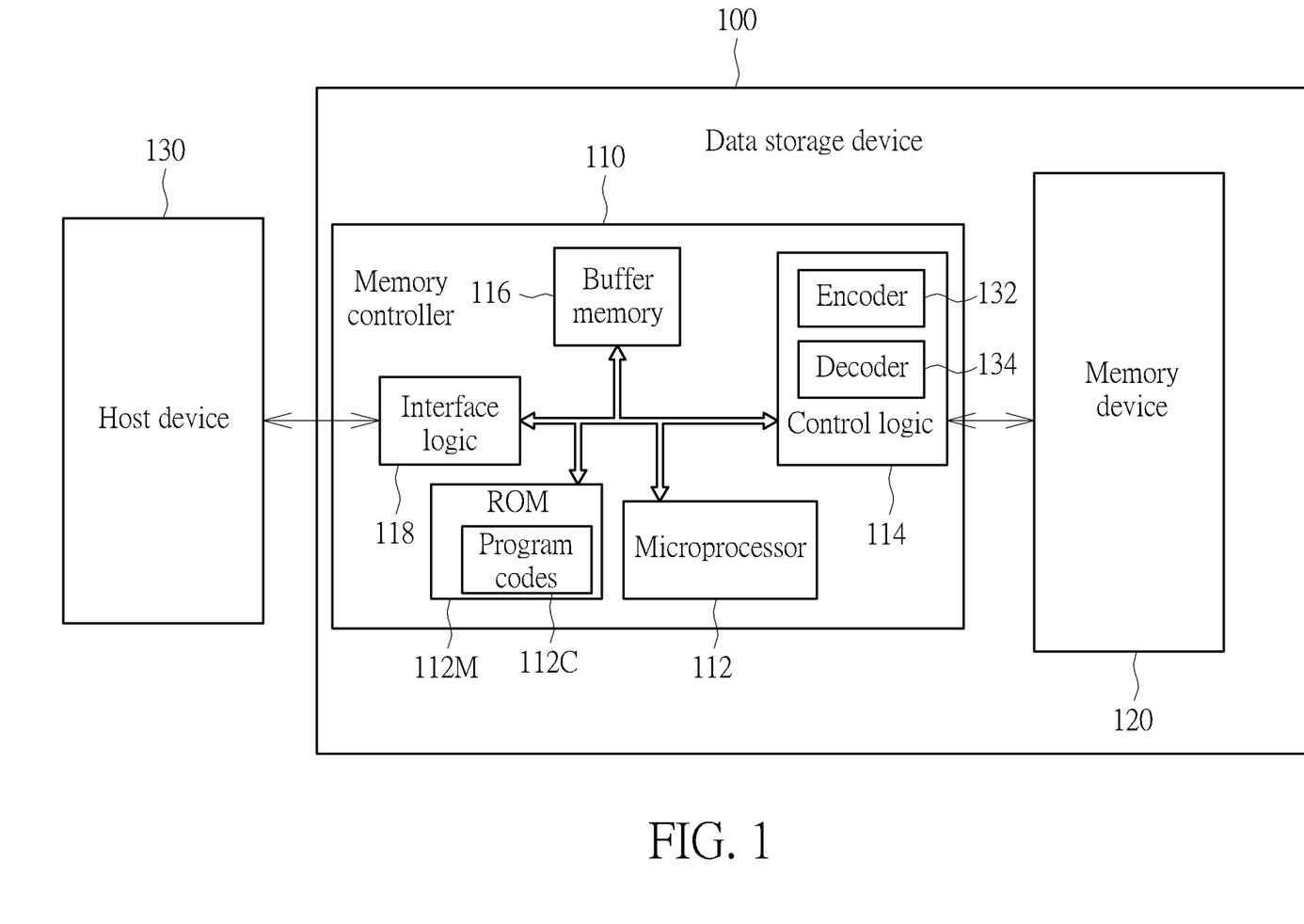
FIG. 1 shows an exemplary block diagram of a data storage device according to an embodiment of the invention.

FIG. 1 shows an exemplary block diagram of a data storage device 100 according to an embodiment of the invention. The data storage device 100 may comprise a memory device 120, such as a flash memory module or a flash memory device (hereinafter collectively called the memory device for brevity), and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C, and the microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips or flash memory dies, and each flash memory chip or flash memory die may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, such as the physical pages, wherein the access unit of a write operation performed by the controller (e.g., the memory controller 110, through the execution of the program codes 112C by the microprocessor 112) on the memory device 120 may be one page.

In practice, through the execution of the program codes 112C by the microprocessor 112, the memory controller 110 may perform various control operations by using its own internal components for example, using the control logic 114 to control the access operations (especially the access operation for at least a memory block or at least a page) of the memory device 120, using the buffer memory 116 to perform necessary data buffer operations, and using the interface logic 118 to communicate with a host device 130. The interface logic 118 may be regarded as a front-end controller engine, which is configured to transmit communication signals between the memory controller 110 and the host device 130, transmit the read/write data of the host device 130 and control the scheduling of the read/write tasks. The control logic 114 may be regarded as a back-end controller engine, which is configured to transmit communication signals between the memory controller 110 and the memory device 120, transmit the data to be written into or read from the memory device 120, perform corresponding encoding operations on the data via the encoder 132 before writing the data into the memory device 120 and perform corresponding decoding operations on the data via the decoder 134 after reading the data from the memory device 120.

In an embodiment of the invention, the memory controller 110 may use the interface logic 118 to communicate with a host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the MMC interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be a Static RAM (SRAM), but the invention should not be limited thereto.

In an embodiment of the invention, the data storage device 100 may be a portable storage device (for example, the memory card in compliance with the SD/MMC, CF, MS, XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data. According to an embodiment of the invention, the memory device 120 may be a 3D NAND-type flash memory device.

Generally, the memory device 120 may be logically divided into three regions, including the system region, the data region and the spare region. Each region may comprise one or more memory blocks. The memory blocks belonging to the system region may be utilized to store the system data required for managing the memory device 120. The memory blocks belonging to the spare region are the spare blocks, or called the empty block, which do not store valid data. The memory blocks belonging to the data region may be utilized to store the data (for example, the user data) received from the host device 130. The memory controller 110 may select one or more memory blocks from the spare region as the active memory block, or called the buffer, for receiving and buffering data. The memory controller 110 may update an active memory block as a data block in the data region when the active memory block is full.

Since the user or the host device 130 may update the content of the data anytime, the data stored in the memory blocks may change from valid data to invalid data in response to the subsequent write operation of the host device 130. For example, each memory block may comprise a plurality of storage units, and the size of one storage unit may correspond to, for example, but not limited to, the size of one logical page, or 4K bytes. Suppose that two storage units (for example, the first storage unit and the second storage unit) are both direct to the same logical page, and this logical page is directed first to the first storage unit in response to a first write operation, and then directed to the second storage unit in response to a second write operation, such a change means that content of the data corresponding to this logical page has been updated from the content stored in the first storage unit to the content stored in the second storage unit. Therefore, the data stored in the second storage unit is valid data and the data stored in the first storage unit becomes invalid data. Here, the words "directed to" refer to the mapping relationship between the logical address and the physical address. For example, the physical to logical mapping relationship of a physical storage unit UA directing to a logical page PB means that the data stored in the physical storage unit UA is the data corresponding to the logical page PB. Similarly, the logical to physical mapping relationship of a logical page PB directing to a physical storage unit UA means that the data corresponding to the logical page PB is physically stored in the physical storage unit UA. When the physical to logical mapping relationship of one physical storage unit corresponds with the logical to physical mapping relationship of the logical page that it directs to, the data stored in this physical storage unit is regarded as valid. The aforementioned mapping relationships between the logical addresses and the physical addresses may be recorded by the memory controller 110 in one or more mapping tables. The mapping tables may be stored in the buffer memory 116 or the memory device 120, and the memory controller 110 may update content of the mapping tables in response to the write operations of the host device 130, so that the mapping tables may reflect the latest mapping relationships.

The memory controller 110 may trigger a Garbage Collection (GC) operation according to some conditions. In the garbage collection operation, the memory controller 110 may collect valid data which may be originally dispersedly distributed in different memory blocks (the source memory blocks) and gather the valid data in the same memory block (the destination memory block) by performing data movement operation. The memory controller 110 may then release the memory blocks that no longer store any valid data as the spare blocks, or called empty blocks, after the data movement operation. For example, when all the data stored in one memory block becomes invalid data, the memory controller 110 may perform an erase operation on this memory block and update the memory block as a spare block in the spare region, or label this memory block as a memory block belonging to the spare region. Thereafter, when the memory controller 110 needs a new memory block for storing data, the memory controller 110 may directly select a spare block from the spare region.

Usually, the data storage device determines whether to trigger the garbage collection operation according to the number of spare blocks. However, the actual application results show that such a control mechanism will cause a great change in the write speed, resulting in a significant write delay. This is because of that the garbage collection operation comprises read and write operations, as a result, many system resources of the data storage device will be occupied. Therefore, when the garbage collection is triggered, the write speed drops accordingly. When the amount of the garbage collection is not properly planned so that the data storage device needs to perform a large amount of garbage collection, the write speed will drop, significantly.

To solve this problem, a novel data processing method for adaptively and effectively controlling write speed and garbage collection speed of a memory device is proposed. By applying the proposed data processing method, the number of spare blocks can be effectively stabilized by the adaptive control of the write speed and the garbage collection speed. In this manner, the write speed is kept stable and will not drop greatly due to the execution of garbage collection operations, thereby avoiding a significant write delay.

Figure 2:
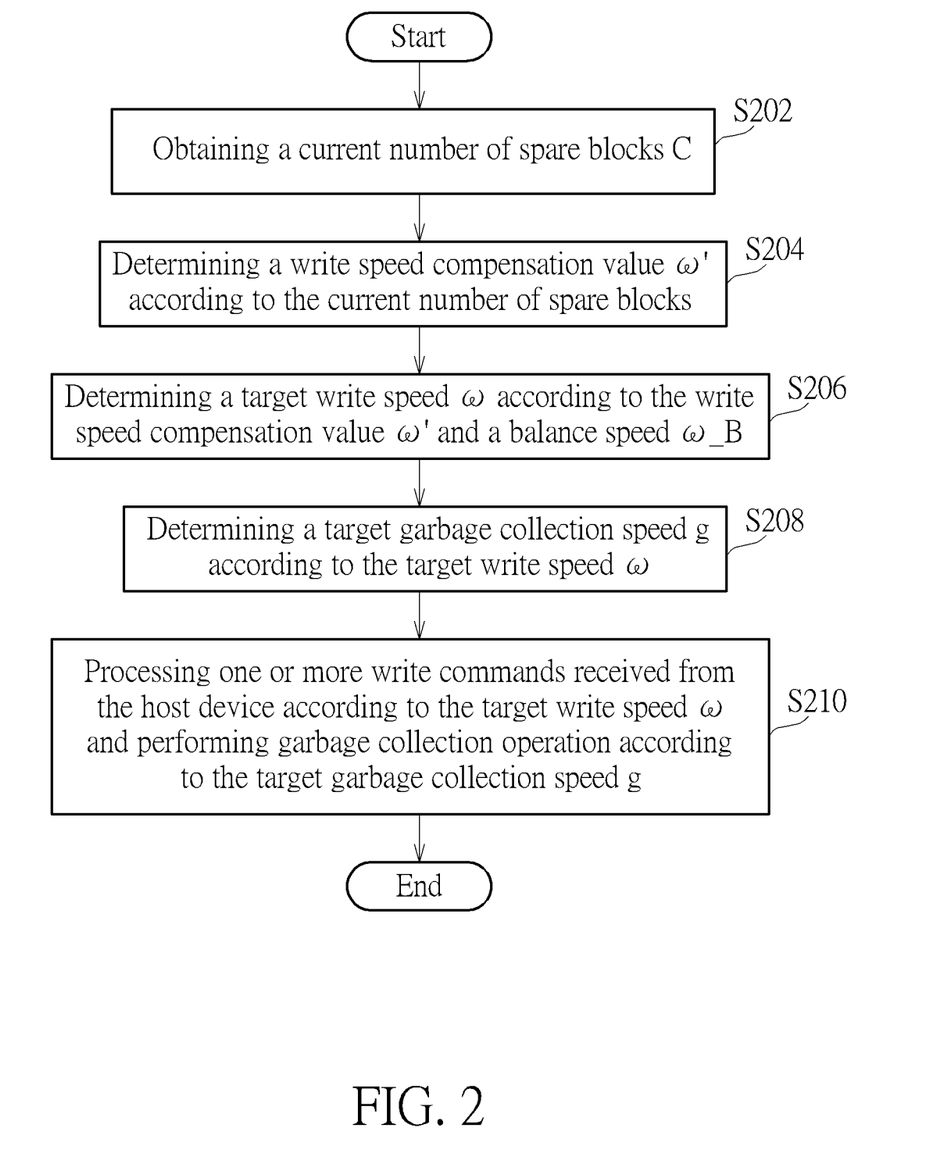
FIG. 2 shows an exemplary flow chart of a data processing method according to an embodiment of the invention.

FIG. 2 shows an exemplary flow chart of a data processing method according to an embodiment of the invention. The data processing method may be performed by the memory controller 110 (for example, the memory controller 110, through the execution of the program codes 112C by the microprocessor 112) and comprise the following steps:

Step S202: Obtaining a current number of spare blocks C.

Step S204: Determining a write speed compensation value $\omega'$ according to the current number of spare blocks.

Step S206: Determining a target write speed $\omega$ according to the write speed compensation value $\omega'$ and a balance speed $\omega\_B$.

Step S208: Determining a target garbage collection speed g according to the target write speed $\omega$.

Step S210: Processing one or more write commands received from the host device and performing one or more corresponding write operations in response to the one or more write commands according to the target write speed $\omega$, and performing the garbage collection operation according to the target garbage collection speed g.

According to an embodiment of the invention, the memory controller 110 may determine a length T of an operation period according to the system clock and the designed work plan within one operation period, wherein the designed work plan within one operation period may be the content actually programmed in the code 112C during the product planning stage. For example, suppose that the content of the program code 112C is designed to execute N lines of machine code within one operation period, the length T of the operation period may be equal to N times of the system clock period.

According to an embodiment of the invention, the memory controller 110 may re-perform the steps shown in FIG. 2 when a new operation period begins. Therefore, the current number of spare blocks C obtained in step S202 may be the result corresponding to the current operation period (in other words, the number of spare blocks C obtained in different operation periods may be the same value or different values), and after determining the target write speed co and the target garbage collection speed g, the memory controller 110 may complete the write operation to write the data received from the host (that is, the write data or the host data) into the memory device 120 according to the target write speed ω and complete a predetermined amount of garbage collection operations according to the target garbage collection speed g within the current operation period. When the current operation period is ended, the memory controller 110 may obtain the number of spare blocks C, again, corresponding to a next operation period and accordingly re-determine the parameters, including: the write speed compensation value ω', the target write speed ω and the target garbage collection speed g, corresponding to the next operation period, process one or more write commands received from the host device and perform one or more write operations in response to the one or more write commands in the next operation period according to the re-determined target write speed ω, and perform the garbage collection operation according to the re-determined target garbage collection speed g.

It should be noted that, the memory controller 110 may be also designed to obtain the current number of spare blocks C after performing the write operation and garbage collection operation, and the number of spare blocks C currently obtained may be provided to be used in the next operation period. Therefore, the invention is not limited to the execution order shown in FIG. 2. For example, if substantially the same result can be obtained, step S202 can be arranged after step S210.

According to an embodiment of the invention, the microprocessor 112 may be a dual-core microprocessor. The first core may be configured to perform steps S202 to S208. That is, the first core may be configured to determine the target write speed ω and the target garbage collection speed g associated with the current operation period, and to configure the sizes of the cache memories used in this operation period according to these speeds. The second core may be configured to perform step S210. That is, after configuring the cache memories, the second core may be configured to perform the host write operation by using the cache memory to temporarily store the write data received from the host device and writing the data temporarily stored in the cache memory into the memory device 120 and perform the garbage collection operation at the same time by using the cache memory, so that the newly generated spare blocks can be released when the existing spare blocks are kept being consumed in the write operation.

To be more specific, since the target write speed ω and the target garbage collection speed g may be respectively defined by the amount of data processed per unit time, for example, how many host data is expected to be written within one operation period and how many new spare blocks is expected to be generated within one operation period, the target write speed ω and the target garbage collection speed g are actually related to the amount of host data and the amount of garbage collection data that are designated to be processed by the microprocessor 112 in one operation period, respectively. Therefore, after determining the target write speed ω and the target garbage collection speed g associated with the current operation period, the first core may configure the sizes of the cache memories used in this operation period according to these speeds.

For example, the memory controller 110 (or, the first core of the microprocessor 112) may configure the size of the first cache memory used in the current operation period according to the target write speed ω, where the first cache memory is used to temporarily store the write data (i.e. host data) received from the host device 130 to assist the memory controller 110 in executing one or more write commands, and may configure the size of the second cache memory used in the current operation according to the target garbage collection speed g, where the second cache memory is used to assist the memory controller 110 in performing garbage collection operations, for example, the second cache memory may be used to temporarily store the valid data collected from multiple memory blocks.

According to an embodiment of the invention, the memory controller 110 may configure two predetermined storage spaces in the buffer memory 116 or an external random access memory (comprised in the data processing device 100 but outside of the memory controller 110, not shown in the figure) as the aforementioned first cache memory and second cache memory, and dynamically configure the range can be used (i.e. the size of usable memory space) in the first cache memory and the second cache memory according to the currently determined target write speed ω and target garbage collection speed g for each operation period. By dynamically limiting the range can be used in the cache memories in each operation period according to the latest determined speeds, the write speed and the garbage collection speed are well controlled.

According to an embodiment of the invention, since the memory controller 110 dynamically determines (re-determines) the target write speed ω and the target garbage collection speed g in each operation period, the target write speeds ω determined in the two operation periods may be the same value or different values. Similarly, the target garbage collection speeds determined in the two operation periods may be the same value or different values.

In addition, in the embodiment of the invention, the balance speed ω_B may be related to the read speed and/or write speed of the memory device 120. The method of determining each parameter will be described in more detail below.

Figure 3:
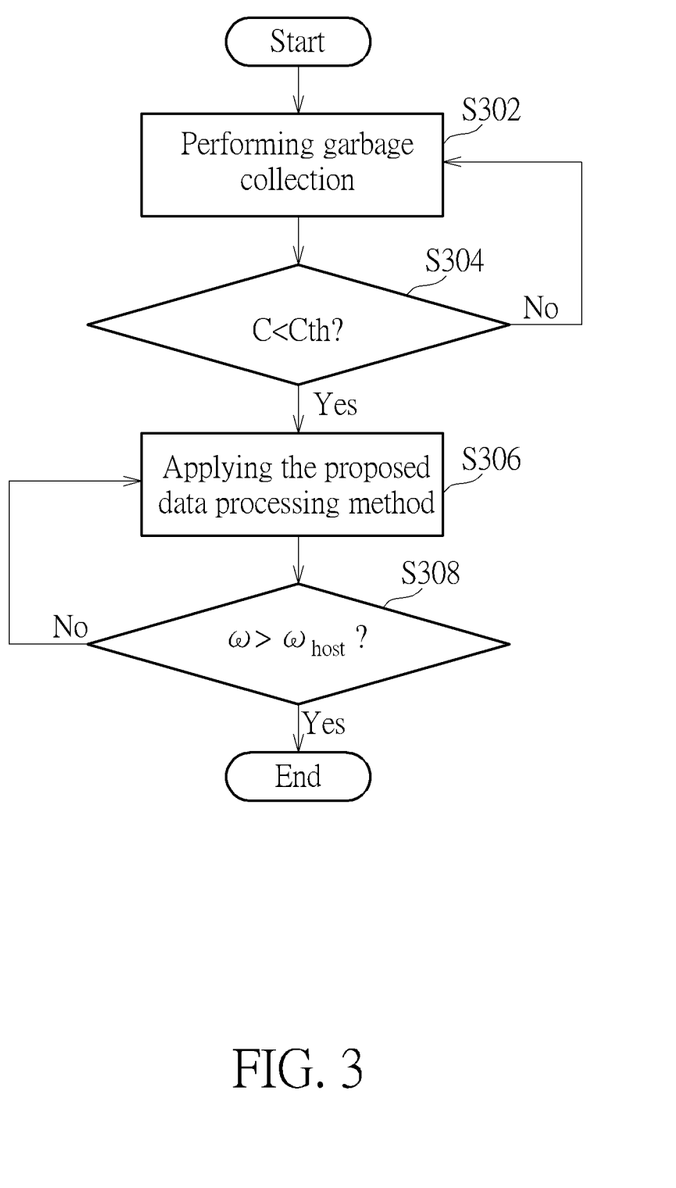
FIG. 3 shows an exemplary flow chart of another data processing method according to an embodiment of the invention.

FIG. 3 shows an exemplary flow chart of another data processing method according to an embodiment of the invention, for illustrating the start and end conditions of the proposed data processing method.

Step S302: Performing a normal garbage collection operation.

Step S304: Determining whether the current number of spare blocks C is less than a threshold value Cth, where the threshold value Cth may be designed based on system requirements. In an embodiment of the invention, the memory controller 110 may execute the determination in step S304 after the garbage collection operation is completed. If yes, step S306 is performed. If not, step S302 is performed.

Step S306: Applying the proposed data processing method, for example, the flow shown in FIG. 2.

Step S308: Determining whether the target write speed ω is greater than the data write speed $\omega_{host}$ requested by the host device 130. The host device 130 may notify the memory controller 110 of the requested data write speed $\omega_{host}$ through a command or a signal. The data write speed $\omega_{host}$ may be defined by the amount of data requested by the host device 130 to be written per unit time. Therefore, the data write speed $\omega_{host}$ is actually related to the amount of write data requested to be written or the amount write commands issued by the host device 130. If yes, it means that after applying the proposed data processing method, the target write speed ω set by the memory controller 110 is greater than the data write speed $\omega_{host}$ requested by the host device 130. Since the target write speed ω is adjusted to be sufficient to cope with the data write speed $\omega_{host}$ requested by the host device 130, the proposed data processing method can be ended. If not, it is necessary to continue to apply the proposed data processing method, so that the write speed $\omega$ can be well controlled and kept stable.

Figure 4:
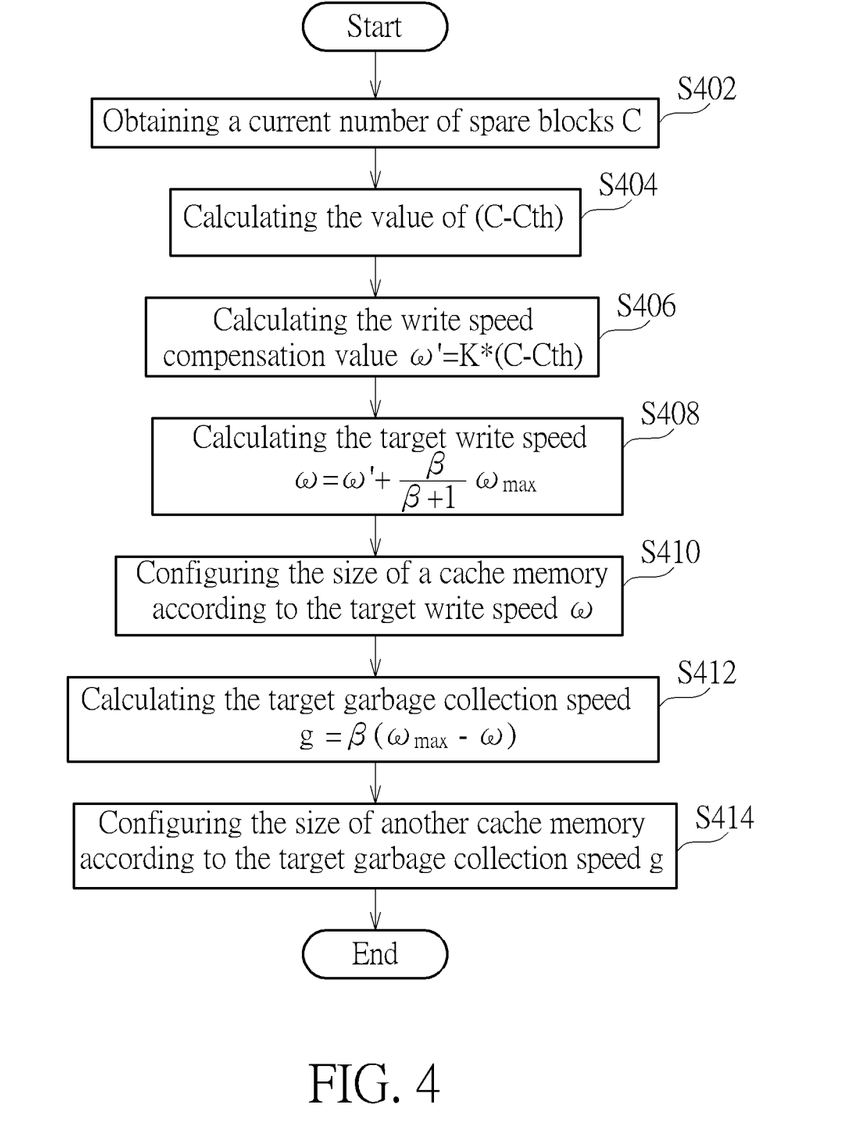
FIG. 4 shows a detailed flow chart of the data processing method according to an embodiment of the invention.

FIG. 4 shows a detailed flow chart of the data processing method according to an embodiment of the invention, for illustrating the detailed operation of the data processing method. The data processing method maybe executed by the memory controller 110 or the dual-core microprocessor 112 and may comprise the following steps:

Step S402: Obtaining a current number of spare blocks C.

Step S404: Calculating the difference between the number of spare blocks C and the threshold value Cth.

Step S406: Multiplying the difference by a proportional control parameter K to determine the write speed compensation value $\omega'$. According to an embodiment of the invention, the proportional control parameter K is used to amplify the aforementioned difference. The larger the proportional control parameter K is, the faster the response speed of the proportional controller. In the embodiments of the invention, the proportional control parameter K may be arbitrarily selected as long as the selected proportional control parameter K satisfies the condition $K*(C-Cth) \leq \omega_{max}$, where $\omega_{max}$ is the maximum write speed that can be supported by the data processing device 100.

Step S408: Calculating the target write speed $$\omega = \omega' + \frac{\beta}{\beta+1}\omega_{max}.$$

where the $$\frac{\beta}{\beta+1}\omega_{max}$$

is the balance speed $\omega\_B$, $\beta$ is a value related to a ratio of the time required for a write operation and a garbage collection operation, which will be introduced in the following paragraphs.

Step S410: Configuring the size of the cache memory used to perform the write operation in the current operation period according to the target write speed $\omega$.

Step S412: Calculating the target garbage collection speed $g=\beta(\omega_{max}-\omega)$.

Step S414: Configuring the size of the cache memory used to perform the garbage collection operation in the current operation period according to the target garbage collection speed g.

According to an embodiment of the invention, suppose that $T_{SR}$ is the time required to read the data of one storage unit of the SLC memory block, $T_{SP}$ is the time required to write data into one storage unit of the SLC memory block, $T_{TR}$ is the time required to read the data from one storage unit of the TLC memory block, $T_{TR}$ is the time required to write data into one storage unit of the TLC memory block, and T is the time (i.e. the length) of one operation period. Then $\beta$ may be calculated according to the content shown in Table 1 below:

TABLE 1

Method for calculating $\beta$

|  | Scenario 1 | Scenario 2 | Scenario 3 | Scenario 4 |
|---|---|---|---|---|
| SLC | $\dfrac{T_{SP}}{T_{SR}+T_{SP}}$ | $\dfrac{T_{SP}}{T_{SR}+T_{TP}}$ | $\dfrac{T_{SP}}{T_{TR}+T_{SP}}$ | $\dfrac{T_{SP}}{T_{TR}+T_{TP}}$ |
| TLC | $\dfrac{T_{TP}}{T_{SR}+T_{SP}}$ | $\dfrac{T_{TP}}{T_{SR}+T_{TP}}$ | $\dfrac{T_{TP}}{T_{TR}+T_{SP}}$ | $\dfrac{T_{TP}}{T_{TR}+T_{TP}}$ |

On the left side of the table, the labeled SLC represents that the active memory block used for receiving host data is an SLC memory block, and the labeled TLC represents that the active memory block used for receiving host data is a TLC memory block. The scenario 1 represents that in the garbage collection operation, the source memory block is the SLC memory block and the destination memory block is the SLC memory block. The scenario 2 represents that in the garbage collection operation, the source memory block is the SLC memory block and the destination memory block is the TLC memory block. The scenario 3 represents that in the garbage collection operation, the source memory block is the TLC memory block and the destination memory block is the SLC memory block. The scenario 4 represents that in the garbage collection operation, the source memory block is the TLC memory block and the destination memory block is the TLC memory block. Depending on the types of active memory block, source memory block, and destination memory block currently configured by the data storage device, the value of the corresponding ratio $\beta$ can be calculated.

The maximum write speed $\omega_{max}$ may be calculated based on the content shown in Table 2 below:

TABLE 2

Method for calculating $\omega_{max}$

| SLC | $\dfrac{T}{T_{SP}}$ |
|---|---|
| TLC | $\dfrac{T}{T_{TP}}$ |

Similarly, the SLC labeled on the left side of the table represents that the active memory block used for receiving host data is an SLC memory block, and the TLC represents that the active memory block used for receiving host data is a TLC memory block. Depending on the type of active memory block currently configured by the data storage device, the corresponding maximum write speed $\omega_{max}$ can be calculated.

Figure 5:
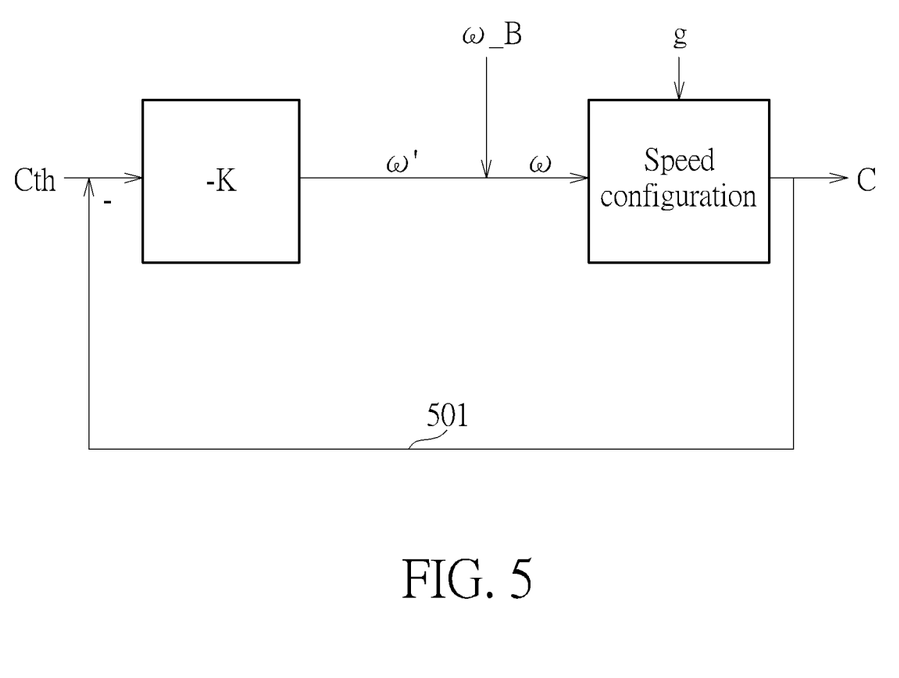
FIG. 5 shows a feedback control system according to an embodiment of the invention.

FIG. 5 shows a feedback control system according to an embodiment of the invention. The feedback control system may be implemented by a proportional controller. As shown in FIG. 5, the current number of spare blocks C is fed back to the proportional controller through the feedback path 501, and the proportional controller multiplies the difference between the threshold value Cth and the current number of spare blocks C by $-K$ to obtain the write speed compensation value $\omega'$, and then adds the write speed compensation value $\omega'$ and the balance speed $\omega\_B$ to obtain the target write speed $\omega$. The proportional controller may also derive the target garbage collection speed g according to the target write speed $\omega$ as shown in step S412, and finally perform speed configuration (which is equivalent to the cache memory configuration) according to the obtained target write speed ω and the target garbage collection speed g. After one operation period is ended, the current number of spare blocks C will be updated due to the executions of write operation and garbage collection operation, and the updated number will be fed back to the proportional controller through the feedback path 501.

One of the spirits of the invention is that by controlling the ratio of the write speed (which is equivalent to the amount of host data written into the memory device 120) and the garbage collection speed (which is equivalent to the amount of data processed in the garbage collection operation), the number of spare blocks can be controlled stable. When the number of spare blocks is stable, for example, after one or more operation periods, the number of spare blocks is controlled to be a fixed value, the write speed can be kept stable and will not greatly drop due to execution of the garbage collection operations as in the prior art, thereby avoiding significant write delay being generated, and the problems in the prior art can be effectively solved.

Figure 6:
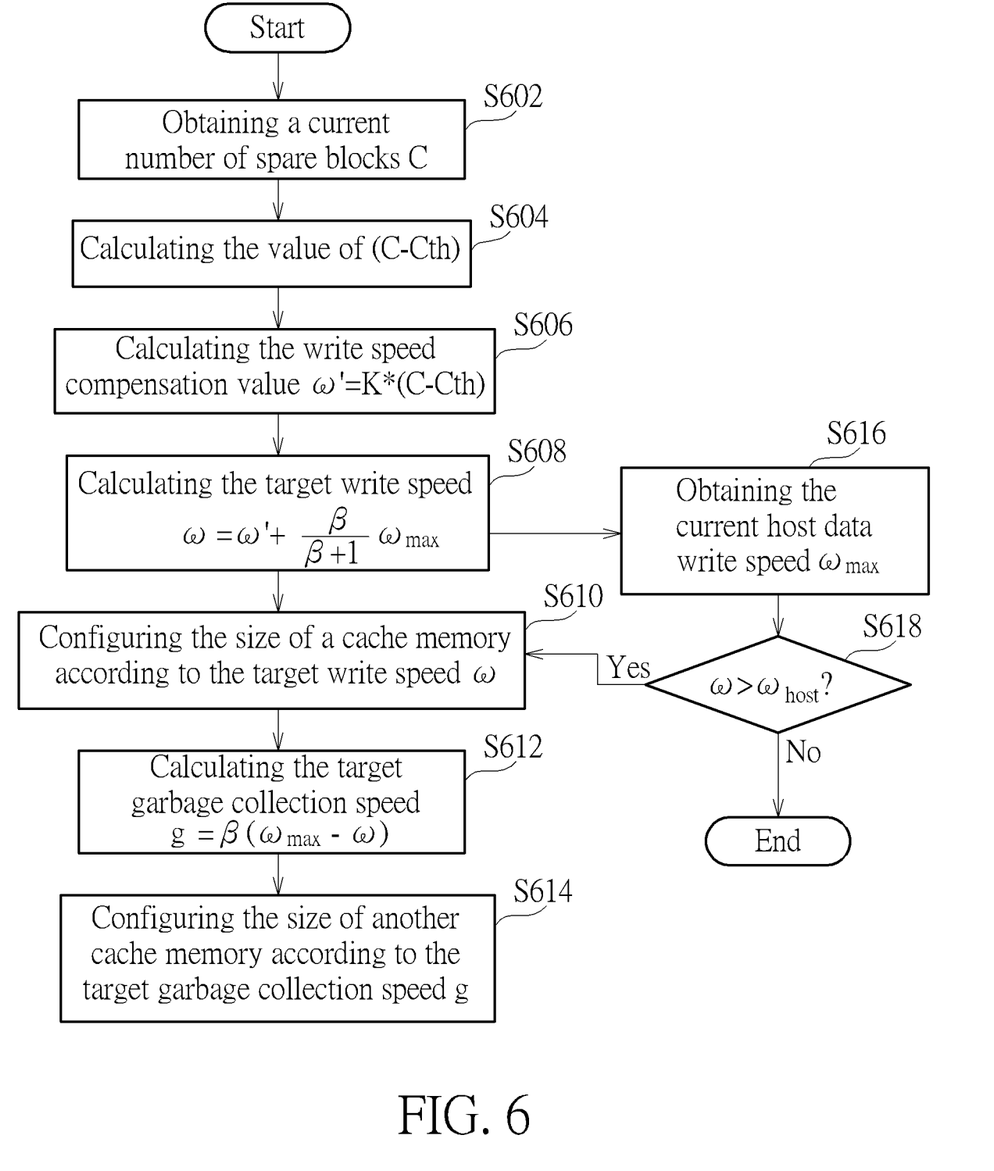
FIG. 6 shows another detailed flow chart of the data processing method according to an embodiment of the invention.

FIG. 6 shows another detailed flow chart of the data processing method according to an embodiment of the invention. The steps in the flow shown in FIG. 6 are similar to those in FIG. 4, where steps S602 to S614 are the same as steps S402 to S414. Therefore, the relevant content may refer to the paragraphs for illustrating FIG. 4, and will not be repeated here for brevity.

In this embodiment, the determination of whether the target write speed ω is greater than the data write speed $\omega_{host}$ requested by the host device 130 is added. As shown in the FIG. 6, after the target write speed ω is calculated in step S608, the memory controller 110 or the microprocessor 112 may further perform the following steps:

Step S616: Obtaining the data write speed $\omega_{host}$ currently requested by the host device 130 (the current host data write speed $\omega_{host}$ as shown, which may be defined by the amount of data requested by the host device 130 to be written per unit time).

Step S618: Determining whether the target write speed ω is greater than the data write speed $\omega_{host}$ requested by the host device 130. If yes, the process ends. If not, step S610 is performed to further configure the size of the cache memory used to perform the write operation in the current operation period according to the target write speed ω.

In summary, via the proposed data processing method, the number of spare block can be effectively stabilized by adaptively controlling the write speed and garbage collection speed of the memory device based on the current number of spare blocks and the types of currently configured active memory block, source memory block and destination memory block. In this manner, the write speed can be kept stable and will not drop significantly due to the execution of garbage collection operations, thereby avoiding the generation of significant write delay.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing method for a data storage device comprising a memory device and a memory controller, wherein the memory device comprises a plurality of memory blocks and the memory blocks comprising a plurality of spare blocks, and the data processing method comprises:

obtaining a number of spare blocks corresponding to a first operation period;

determining whether the number of spare blocks is less than a threshold value;

determining a write speed compensation value according to the number of spare blocks when the number of spare blocks is less than the threshold value;

determining a target write speed according to the write speed compensation value and a balance speed;

determining a target garbage collection speed according to the target write speed;

processing one or more write commands received from a host device in the first operation period according to the target write speed; and performing at least one garbage collection operation in the first operation period according to the target garbage collection speed, and wherein the method further comprises:

determining whether the target write speed is greater than a data write speed requested by the host device; and determining to re-determine the target write speed and the target garbage collection speed corresponding to a second operation period when the target write speed is not greater than the data write speed requested by the host device.

2. The data processing method as claimed in claim 1, further comprising:

configuring a size of a first cache memory utilized in the first operation period according to the target write speed, wherein the first cache memory is utilized for buffering write data received from the host device to assist the memory controller in executing the one or more write commands; and configuring a size of a second cache memory utilized in the first operation period according to the target garbage collection speed, wherein the second cache memory is utilized for assisting the memory controller in performing the at least one garbage collection operation.

3. The data processing method as claimed in claim 1, further comprising:

obtaining the number of spare blocks corresponding to the second operation period;

re-determining the write speed compensation value according to the number of spare blocks;

re-determining the target write speed according to the re-determined write speed compensation value and the balance speed;

re-determining the target garbage collection speed according to the re-determined target write speed;

processing one or more write commands received from the host device in the second operation period according to the re-determined target write speed; and performing the at least one garbage collection operation in the second operation period according to the re-determined target garbage collection speed.

4. The data processing method as claimed in claim 3, wherein the target write speed determined in the first operation period and the re-determined target write speed re-determined in the second operation period are different.

5. The data processing method as claimed in claim 3, wherein the target garbage collection speed determined in the first operation period and the re-determined target garbage collection speed re-determined in the second operation period are different.

6. The data processing method as claimed in claim 1, wherein the balance speed is related to a read speed of the memory device.

7. The data processing method as claimed in claim 1, wherein the balance speed is related to a write speed of the memory device.

8. A memory controller, coupled to a host device and a flash memory device and configured to access the flash memory device, comprising:
a buffer memory, comprising at least a first cache memory and a second cache memory; and
a microprocessor, configured to control access of the flash memory device,
wherein the microprocessor is configured to obtain a number of spare blocks of the flash memory device corresponding to a first operation period, determine whether the number of spare blocks is less than a threshold value, and when the number of spare blocks is less than the threshold value, the microprocessor is further configured to determine a write speed compensation value according to the number of spare blocks, determine a target write speed according to the write speed compensation value and a balance speed, and determine a target garbage collection speed according to the target write speed,
wherein the microprocessor is further configured to process one or more write commands received from the host device in the first operation period according to the target write speed and perform at least one garbage collection operation in the first operation period according to the target garbage collection speed, and
wherein the microprocessor is further configured to determine whether the target write speed is greater than a data write speed requested by the host device, and when the target write speed is not greater than the data write speed requested by the host device, the microprocessor is further configured to re-determine the target write speed and the target garbage collection speed corresponding to a second operation period.

9. The memory controller as claimed in claim 8, wherein the microprocessor is further configured to configure a size of the first cache memory and a size of the second cache memory utilized in the first operation period according to the target write speed and the target garbage collection speed, wherein the first cache memory is utilized for buffering write data received from the host device to assist the microprocessor in executing the one or more write commands, and the second cache memory is utilized for assisting the microprocessor in performing the at least one garbage collection operation.

10. The memory controller as claimed in claim 8, wherein the microprocessor is further configured to obtain the number of spare blocks of the flash memory device corresponding to the second operation period, re-determine the write speed compensation value according to the number of spare blocks, re-determine the target write speed according to the re-determined write speed compensation value and the balance speed, and re-determine the target garbage collection speed according to the re-determined target write speed, and wherein the microprocessor is further configured to process one or more write commands received from the host device in the second operation period according to the re-determined target write speed and perform the at least one garbage collection operation in the second operation period according to the re-determined target garbage collection speed.

11. The memory controller as claimed in claim 10, wherein the target write speed determined in the first operation period and the target write speed re-determined in the second operation period are different.

12. The memory controller as claimed in claim 10, wherein the target garbage collection speed determined in the first operation period and the target garbage collection speed re-determined in the second operation period are different.

13. The memory controller as claimed in claim 8, wherein the balance speed is related to a read speed of the flash memory device.

14. The memory controller as claimed in claim 8, wherein the balance speed is related to a write speed of the flash memory device.

15. A data storage device, coupled to a host device, comprising:
a flash memory device, comprising a plurality memory blocks, wherein the memory blocks comprises a plurality of spare blocks; and
a memory controller, coupled to the flash memory device and configured to access the flash memory device, wherein the memory controller is configured to obtain a number of spare blocks corresponding to an operation period, determine whether the number of spare blocks is less than a threshold value, and when the number of spare blocks is less than the threshold value, the microprocessor is further configured to determine a write speed compensation value according to the number of spare blocks, determine a target write speed according to the write speed compensation value and a balance speed, and determine a target garbage collection speed according to the target write speed,
wherein the memory controller is further configured to process one or more write commands received from the host device in the operation period according to the target write speed and perform at least one garbage collection operation in the operation period according to the target garbage collection speed, and
wherein the microprocessor is further configured to determine whether the target write speed is greater than a data write speed requested by the host device, and when the target write speed is not greater than the data write speed requested by the host device, the microprocessor is further configured to re-determine the target write speed and the target garbage collection speed corresponding to a second operation period.

* * * * *